United States Patent
Sturt

(10) Patent No.: US 6,926,333 B2
(45) Date of Patent: Aug. 9, 2005

(54) MODULAR OVERHEAD CONSOLE ASSEMBLY

(75) Inventor: Alan Sturt, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/745,063

(22) Filed: Dec. 22, 2003

(65) Prior Publication Data

US 2005/0134072 A1 Jun. 23, 2005

(51) Int. Cl.$^7$ ................................................ B60N 3/12
(52) U.S. Cl. ...................................... 296/37.8; 296/214
(58) Field of Search ............................. 296/37.7, 37.1, 296/214, 37.8, 193.04

(56) References Cited

U.S. PATENT DOCUMENTS

| | | |
|---|---|---|
| 3,917,207 A | 11/1975 | Quigley |
| 4,241,870 A | 12/1980 | Marcus |
| 4,738,481 A | 4/1988 | Watjer et al. |
| 4,783,110 A | 11/1988 | Beukema et al. |
| 4,844,533 A | 7/1989 | Dowd et al. |
| 4,867,498 A | 9/1989 | Delphia et al. |
| 4,893,866 A | 1/1990 | Dowd et al. |
| 4,941,718 A | 7/1990 | Alexander et al. |
| 5,020,845 A | 6/1991 | Falcoff et al. |
| 5,040,990 A | 8/1991 | Suman et al. |
| 5,050,922 A | 9/1991 | Falcoff |
| D320,587 S | 10/1991 | Kapp et al. |
| 5,154,617 A | 10/1992 | Suman et al. |
| 5,186,517 A | 2/1993 | Gilmore et al. |
| 5,303,970 A | 4/1994 | Young et al. |
| 5,403,058 A | 4/1995 | Fischer |
| 5,522,638 A | 6/1996 | Falcoff et al. |
| 5,667,896 A | 9/1997 | Carter et al. |
| 5,775,762 A | 7/1998 | Vitito |
| 5,822,023 A | 10/1998 | Suman et al. |
| 5,873,597 A | 2/1999 | Sim |
| 5,887,929 A | 3/1999 | Miller et al. |
| 5,887,939 A | 3/1999 | Yamaguchi et al. |
| 5,927,784 A | 7/1999 | Vitito |
| 6,003,925 A | 12/1999 | Litke et al. |
| 6,019,411 A | 2/2000 | Carter et al. |
| 6,065,793 A | 5/2000 | Koshida et al. |
| 6,076,885 A | 6/2000 | Curtindale et al. |

(Continued)

FOREIGN PATENT DOCUMENTS

DE 198 22 638 C2 6/2000

OTHER PUBLICATIONS

Abstract Corresponding To DE 198 22 638 C2.

(Continued)

*Primary Examiner*—Jason Morrow
(74) *Attorney, Agent, or Firm*—Bill C. Panagos

(57) ABSTRACT

A modular overhead console assembly is provided on a headliner in a passenger compartment of a vehicle. An overhead console housing is configured for securement in a elongated channel of the headliner. The overhead console housing includes an accessory module receiving area including a plurality of slots adapted to receive one or more accessory modules. Each accessory module includes a first console divider, an opposing second console divider and a storage area defined therebetween. A door is pivotally mounted to the first console divider and releasably secured to the second console divider. At least one retainer clip extends from a top surface of each of the first and second console dividers to engage the slots in the accessory module receiving area.

16 Claims, 3 Drawing Sheets

U.S. PATENT DOCUMENTS

| | | |
|---|---|---|
| 6,116,675 A | 9/2000 | Iwasawa |
| 6,125,030 A | 9/2000 | Mola et al. |
| 6,126,221 A | 10/2000 | Kern |
| 6,135,528 A | 10/2000 | Sobieski et al. |
| 6,176,536 B1 | 1/2001 | Miller et al. |
| 6,257,745 B1 | 7/2001 | Speth et al. |
| 6,267,428 B1 | 7/2001 | Baldas et al. |
| 6,273,499 B1 | 8/2001 | Guyon |
| 6,338,517 B1 | 1/2002 | Canni et al. |
| 6,364,390 B1 | 4/2002 | Finneman |
| 6,575,528 B2 | 6/2003 | Tiesler et al. |
| 6,669,260 B2 | 12/2003 | Clark et al. |
| 2001/0005083 A1 | 6/2001 | Serizawa et al. |
| 2002/0163219 A1 | 11/2002 | Clark et al. |
| 2003/0168875 A1 | 9/2003 | Anderson et al. |
| 2004/0061358 A1* | 4/2004 | Vishey et al. .............. 296/214 |
| 2004/0084920 A1* | 5/2004 | Trimble et al. ............ 296/37.8 |
| 2004/0160087 A1* | 8/2004 | Tiesler ..................... 296/37.7 |
| 2004/0169390 A1* | 9/2004 | Tiesler et al. ............. 296/37.8 |

OTHER PUBLICATIONS

Patent Abstracts Of Japan, 11192892 A.

Patent Abstracts Of Japan, 03114926 A.

Patent Abstracts Of Japan, 10278591 A.

esp@cenet—Document Bibliography and Abstract, JP 2001030841.

esp@cenet—Document Bibliography and Abstract, JP 2001130327.

\* cited by examiner

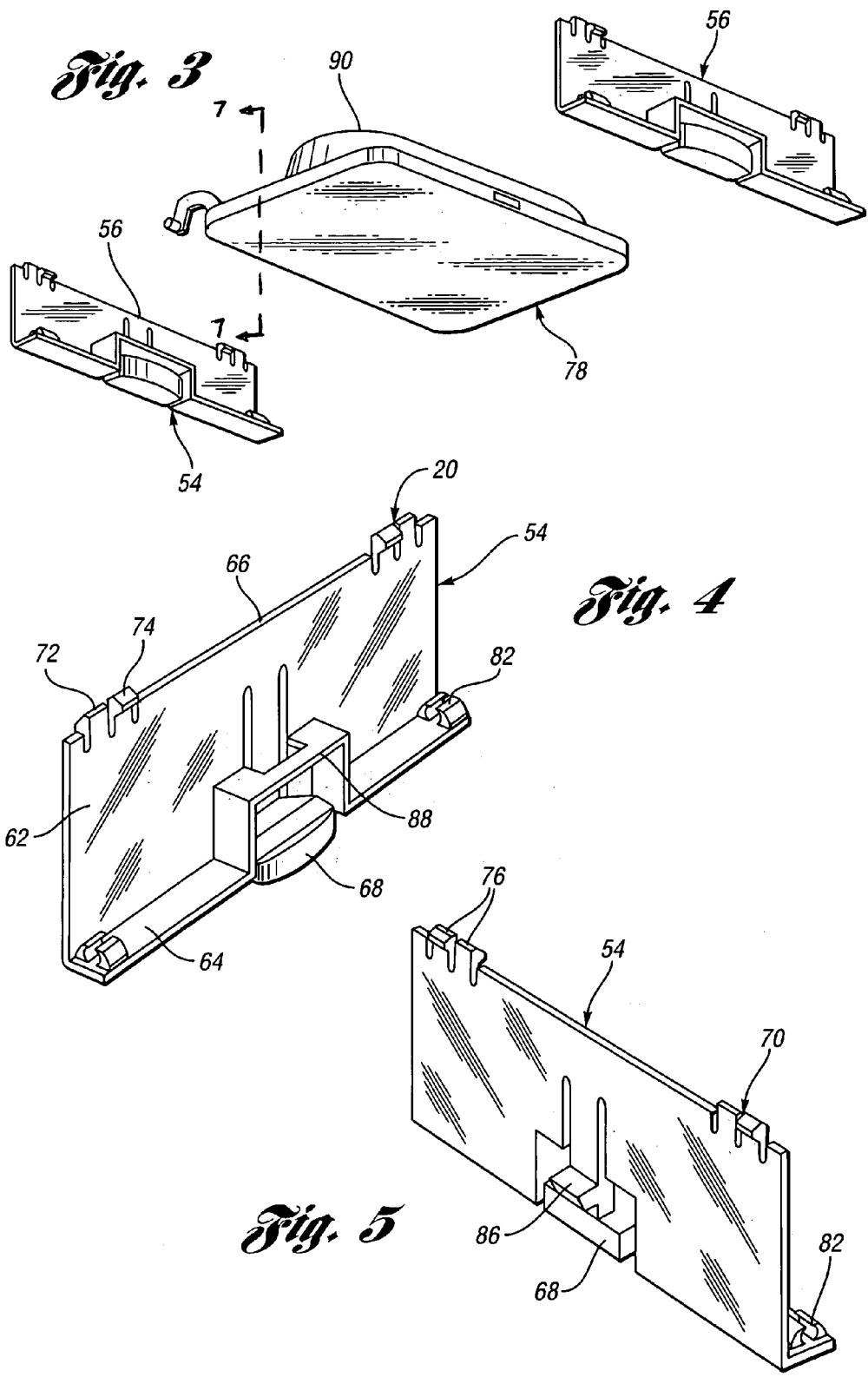

MODULAR OVERHEAD CONSOLE ASSEMBLY

BACKGROUND OF THE INVENTION

1. Field of the Invention

The present invention relates to a modular overhead console assembly configurable for use in a passenger compartment of a vehicle.

2. Background Art

Overhead consoles are commonly provided in the passenger compartment of a vehicle such as an automobile, boat or airplane. Overhead console assemblies are generally elongate structures disposed along the longitudinal axis of a headliner. The headliner includes an upper surface mounted to the interior roof structure of the vehicle and a lower surface having an overlay applied thereon. The overhead console is mounted to the lower surface of the headliner to provide additional storage space for items such as sunglasses, garage door openers and compact discs.

Current overhead console assemblies include a series of accessory compartments for storing items. The accessory compartments are pivotally mounted to the console to allow the passenger to stow and retrieve personal items from the compartment. Overhead consoles assemblies frequently include electrical components, such as overhead lighting fixtures, vehicle controls for the radio and air conditioning systems, electronic components, such as compasses and temperature displays and video monitors.

One significant limitation of current overhead console assemblies is that the accessory compartments cannot be repositioned without a complete rebuild of the console. Fixed accessory compartments restrict passengers from repositioning the compartments based on driver or passenger preference. Another limitation is that stored items must be removed from the accessory compartments to transport the items between the vehicle and another location. It would be advantageous to provide an overhead console assembly for a vehicle having modular accessory compartments easily positionable on the headliner of the vehicle.

SUMMARY OF THE INVENTION

The present invention overcomes the above-referenced problems associated with prior overhead console assemblies by providing a modular overhead console assembly configurable for use in the passenger compartment of a vehicle. The modular overhead console assembly includes a modular console housing having a module receiving area configurable for securement to the headliner and roof structure of the vehicle. This module receiving area is equipped with molded-in features to support for a variable number of console dividers.

The console divider is equipped with molded-in features to attach the console dividers to module receiving area. Each console divider includes molded-in features allowing attachment of a door and latching and unlatching of an adjacent compartment door. Compartment doors may be constructed in a variety of lengths to allow storage of different size items. These lengths will be based on multiples of a unit size in order to take advantage of the support features in the bezel.

The modular overhead console assembly is disposed on a headliner in a passenger compartment of a vehicle. The headliner includes an upper surface, a lower surface and an elongated channel formed therein. An overhead console housing is configured for securement in the elongated channel of the headliner. An accessory module receiving area in the console housing is defined by an upper wall, opposing sidewalls extending vertically from the upper wall and a lower surface. A plurality of slots are provided in the upper wall of the accessory module receiving area.

At least one accessory module is selectively positionable and removably attachable to the accessory module receiving area of the overhead console housing. The at least one accessory module includes a first console divider, an opposing second console divider and a storage area defined therebetween. A door is pivotally mounted to the first console divider and releasably secured to the second console divider. At least one retainer clip extends from a top surface of each of the first and second console dividers to engage the slots in the accessory module receiving area.

The features and advantages of the present invention are readily apparent from the following detailed description of the best mode for carrying out the invention when taken in connection with the accompanying drawings.

BRIEF DESCRIPTION OF THE DRAWINGS

FIG. 3 is an exploded perspective view of a removable accessory module in accordance with the present invention;

FIG. 4 is a rear perspective view of a console divider portion of the removable accessory module;

FIG. 5 is a front perspective view of the console divider portion of the removable accessory module;

DETAILED DESCRIPTION OF THE PREFERRED EMBODIMENT(S)

Figure 1:
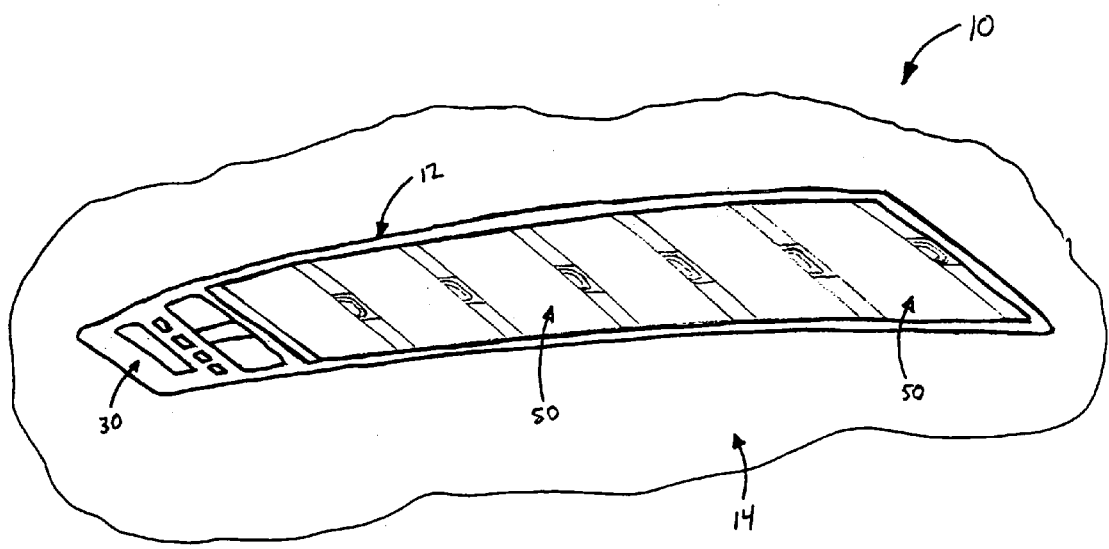
FIG. 1 is a perspective view of a modular overhead console assembly disposed in a headliner of a passenger compartment of a vehicle in accordance with the present invention.
Figure 2:
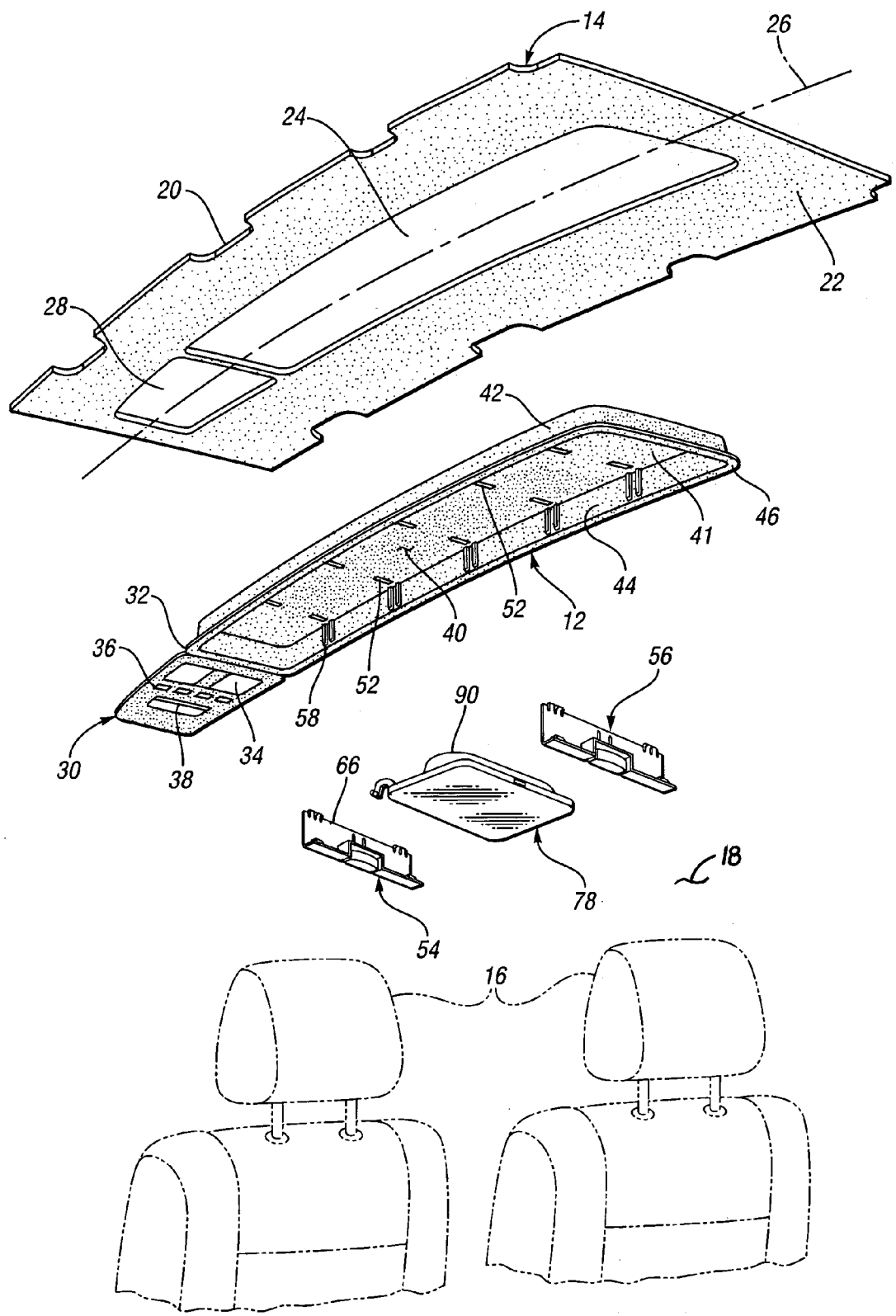
FIG. 2 is an exploded perspective view of the modular overhead console assembly in accordance with the present invention.

Referring now to Figures, a modular overhead console assembly 10 of the present invention is disclosed. FIGS. 1 and 2 illustrate a modular overhead console assembly 10 including an overhead console housing, generally referenced by numeral 12, secured to a headliner 14 above a seating arrangement 16 in a passenger compartment 18 of a vehicle. Headliner 14 includes an upper surface 20 attached to the roof of a vehicle (not shown) and a lower surface 22 having an appearance finish facing the passenger compartment 18.

Headliner 14 is generally formed as a one-piece structural member which extends above the interior passenger compartment of a vehicle. Headliner 14 may have any suitable configuration and comprise any suitable materials, such as any suitable natural materials and/or synthetic materials. Furthermore, the headliner body may include a single layer or multiple layer construction. The headliner body may also include a cover material or overlay (not shown), such as a polymeric material or fabric, that faces the interior passenger compartment of the vehicle.

An elongated channel 24 is formed in the lower surface 22 of the structural member of headliner 14 along a longitudinal axis 26 of the headliner 14. An opening 28 is formed adjacent the front edge of channel 24 to a bezel 30 containing overhead vehicle components, such as lighting fixtures or electronic displays or other devices requiring electrical or electronic interface. In one aspect of the invention, overhead vehicle components are disposed on a forward portion 32 of overhead console housing 12. In another aspect of the invention, overhead vehicle components are mounted in the bezel 30 to headliner 14 independent of overhead console housing 12. It is understood that channel 24 may be formed in the headliner 14 at a variety of positions or geometries to receive console housing 12 and achieve a similar result.

Overhead vehicle components in bezel 30 may include devices such as overhead reading lights 34, switches 36 for controlling sunroof and lighting functions and a universal garage door opener 38 to allow passengers to control a variety of vehicle and external component functions. It is also understood that other components, such as temperature sensors for the passenger compartment, voice recording systems and two-way vehicle communication devices may also be incorporated in the bezel 30 of console assembly 10.

Overhead console housing 12 includes an accessory module receiving area 40. Receiving area 40 is defined by an upper wall 41, a pair of sidewalls 42, 44 extending vertically from the upper wall and a lower surface 46 substantially flush to the lower surface 22 of headliner 14. Overhead console housing 12 is preferably mounted in the channel 24 formed in the lower surface 22 of the headliner 14.

Modular console housing 12 may be formed as a single piece structure or joined as multiple member sections as required by space requirements in the passenger compartment of the vehicle. For example, a single piece rail assembly may be required for the passenger compartment of a compact vehicle, while a multiple piece rail assembly may be necessary to support accessory modules in a sport utility vehicle passenger compartment. In another aspect of the present invention, console housing 12 may be integrally formed into the headliner 14 to receive and removably secure one or more accessory modules 50.

One or more indexes or slots 52 are formed in the upper wall 41 of the console housing 12 to removably secure and position one or more console dividers 54 of the removable accessory modules 50. A plurality of opposing rails 58 are disposed on sidewalls 42, 44 of console housing 12 adjacent slots 42. Rails 58 are provided in opposing pairs on the inner surface of sidewalls 42, 44 to receive and guide console dividers 54 inserted into the module receiving area 40. A description of this interaction will be provided in greater detail below.

Referring additionally now to FIGS. 3–5, the removable accessory module 50 of the present invention is discussed in greater detail. Accessory module 50 comprises a first console divider 54, an opposing second console divider 56 and a storage area 60 defined therebetween. Console dividers 54, 56 are configured to receive and secure a door 78 therebetween. Dividers 54, 56 include a generally vertical sidewall 62, a horizontal bottom surface 64 and a top surface 66. A handle portion 68 is provided in the generally vertical sidewall 62 to releasably engage door 78. In a preferred aspect of the invention, console dividers 54, 56 are identical. However, it is understood that a variety of orientations and geometries may also be used to perform the same function. Further, the size and number of console dividers 54, 56 may be modified based on the design features of module receiving area 40.

At least one retainer clip 70 having one or more arms 72 extends from the top surface 66 of console divider 54. Arm 72 includes a projection 74 which engages the slot 52 in the upper wall 41 of console housing 12 to secure the console divider in position. In a preferred aspect of the invention, a pair of retainer clips 76 each having a pair of arms 72 are provided on the top surface 66 of the console divider to secure the console divider to the console housing 12.

Figure 6:
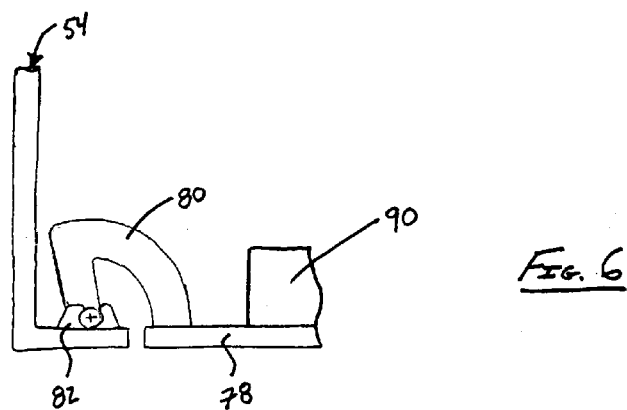
FIG. 6 is a side plan view of the door mounting arrangement for the removable accessory module.

Accessory modules 50 can be configured to store a variety of materials within storage area 60. As is shown in FIGS. 3 and 6, module 50 is configured to hold a pair of sunglasses or the like. A pair of arms 80 pivotally mount door 78 to hinges 82 on an upper portion of the bottom surface 64 of console divider 54. Door 78 extends between an open position generally perpendicular to the bottom surface 64 of console divider 54 and a closed position wherein door 78 is disposed generally parallel to the bottom surface 64, as illustrated in FIG. 6.

An opening 84 on door 78 engages a latch 86 extending from handle 68 on an opposing console divider 56 to secure door 78 in position between dividers 54, 56. The handle 68 is disposable between a locked position illustrated in FIG. 5 and a release position, allowing the door 78 to move from a locked position to a use position by gravity. A bracket 88 extending from the sidewall of the console divider 56 limits the travel of the handle 68. A storage pocket 90 is provided on door 78 to retain sunglasses or the like.

It is understood that the configuration of the accessory module 50 may be modified to store other materials within storage area 60, such as tissue boxes, compact discs or garage door openers. In another aspect of the invention, accessory modules may house electrical components requiring power or signal to operate, such as DVD video player or global position system (GPS) units. The accessory modules include one or more electrical connectors extending from th top surface of the console dividers. Connectors are power contacts which, when placed in contact with electrically conductive strips or wires extending along an upper surface of upper wall of the console housing, provide power to the electrical components stored with module housing.

Figure 7:
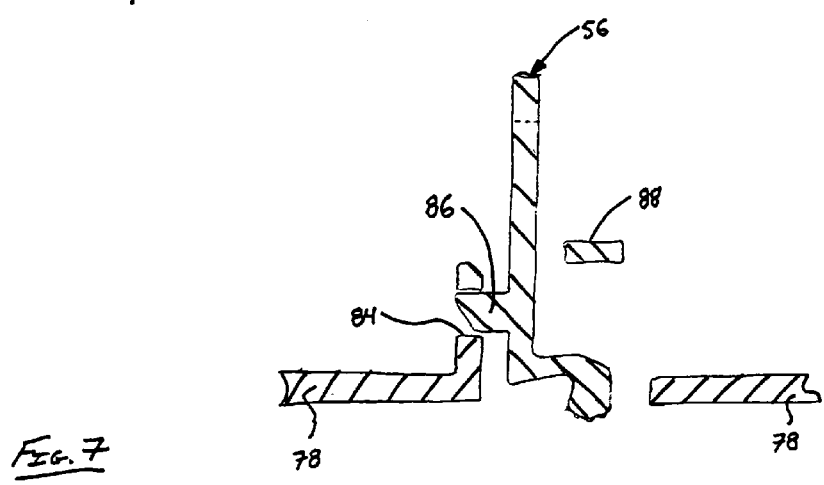
FIG. 7 is a cross-sectional view along line 7—7 of FIG. 3 of the removable accessory module mounting arrangement in accordance with the present invention.

Referring now to FIGS. 2 and 7, a description of the method of assembling the modular overhead console assembly 10 in accordance with the present invention is discussed. Console dividers 54, 56 are inserted into the console receiving area 40. Rails 58 on opposing sidewalls 42, 44 of console housing 12 engage the sidewalls of dividers 54, 56 to align retainer clips 70 with slots 52. Projections 74 on arms 72 extend through and engage slots 52 to secure console dividers 54, 56 in position in the console housing receiving area 48. Mounting arms 80 of door 78 are secured to hinges 82 on console divider 54. The engagement of door 78 with console divider 56 provides additional structural support to adjoining accessory modules 50 in console receiving area 40.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A modular overhead console assembly and headliner combination for use in a passenger compartment of a vehicle, the combination comprising:

a headliner comprising a structural member having an upper surface attachable to a vehicle roof and a lower surface;

an elongated channel formed through the structural member of the headliner;

an overhead console housing configured for securement in the elongated channel in the headliner, the console housing having an upper wall including a plurality of slots, opposing sidewalls extending vertically from the upper wall, a plurality of opposing rails disposed on the sidewalls adjacent the plurality of slots and a lower surface opening to an accessory module receiving area; and at least one accessory module selectively positionable and removably attachable to the overhead console housing, the at least one accessory module including opposing first and second console dividers mountable between the plurality of opposing rails and defining a storage area therebetween, each having at least one retainer clip extending from a top surface of the console divider to engage the slots in the accessory module receiving area, a door pivotally mounted to the first console divider and releasably secured to the second console divider.

2. The combination of claim 1 wherein the console divider further comprises a generally vertical sidewall, a horizontal bottom surface, a top surface and at least one retainer clip having one more arms extending from the top surface of the console divider.

3. The combination of claim 2 wherein the console divider further comprises a handle portion in the generally vertical sidewall to releasably engage the door.

4. The combination of claim 3 wherein the door includes a receiving portion adapted to engage the handle portion mounted on the console divider.

5. The combination of claim 1 wherein a pair of opposing retainer clips extend upward from the top surface of the console divider to engage a pair of slots in the module receiving area.

6. The combination of claim 1 further comprising a bezel configured to receive one or more vehicle control components secured to the headliner adjacent a forward portion of the console housing.

7. The combination of claim 6 wherein the bezel is formed as part of the overhead console housing.

8. A modular overhead console assembly for use with a passenger compartment of a vehicle having a headliner, the headliner having an upper surface, a lower surface and an elongated channel formed therein, the assembly comprising:

an overhead console housing configured for securement in the elongated channel in the headliner, the console housing having an upper wall including a plurality of slots, opposing sidewalls extending vertically from the upper wall, a plurality of opposing rails disposed on the sidewalls adjacent the plurality of slots and a lower surface opening to an accessory module receiving area; and at least one accessory module selectively positionable and removably attachable to the overhead console housing, the at least one accessory module including opposing first and second console dividers mountable between the plurality of opposing rails and defining a storage area therebetween, each having at least one retainer clip extending from a top surface of the console divider to engage the slots in the accessory module receiving area, a door pivotally mounted to the first console divider and releasably secured to the second console divider.

9. The modular overhead console assembly of claim 8 wherein the console divider further comprises a generally vertical sidewall, a horizontal bottom surface, a top surface and at least one retainer clip having one more arms extending from the top surface of the console divider.

10. The modular overhead console assembly of claim 9 wherein the console divider further comprises a handle portion in the generally vertical sidewall to releasably engage the door.

11. The modular overhead console assembly of claim 10 wherein the door includes a receiving portion adapted to engage the handle portion mounted on the console divider.

12. The modular overhead console assembly of claim 8 wherein a pair of opposing retainer clips extend upward from the top surface of the console divider to engage a pair of slots in the module receiving area.

13. The modular overhead console assembly of claim 8 further comprising a bezel configured to receive one or more vehicle control components secured to the headliner adjacent a forward portion of the console housing.

14. The modular overhead console assembly of claim 8 wherein the bezel is formed as part of the overhead console housing.

15. A method of assembling a modular overhead console assembly and headliner combination, the method comprising:

providing a headliner having a structural member including an elongated channel formed therein;

providing an overhead console housing having an upper wall including a plurality of slots, opposing sidewalls extending vertically from the upper wall, a plurality of opposing rails disposed on the sidewalls adjacent the plurality of slots and a lower surface opening to an accessory module receiving area;

securing the overhead console housing in the elongated channel in the headliner;

providing first and second console dividers having a generally vertical sidewall, a horizontal bottom surface, a top surface and at least one retainer clip having one more arms extending from the top surface of the console divider;

mounting the first and second console dividers between the plurality of opposing rails;

securing the at least one retainer clip of the first and second console dividers to the plurality of slots in the module receiving area to define a storage area between the console dividers; and mounting a door between the first and second console dividers to enclose the storage area.

16. The method of claim 15 further comprising the step of mounting a bezel configured to receive one or more vehicle control components adjacent a forward portion of the console housing.

\* \* \* \* \*